United States Patent [19]

Hoelderich et al.

[11] Patent Number: 4,859,642

[45] Date of Patent: Aug. 22, 1989

[54] FIXED-BED CATALYST STRUCTURE OBTAINED USING HONEYCOMB ELEMENTS

[75] Inventors: Wolfgang Hoelderich, Frankenthal; Michael Kroener, Mannheim; Peter Kroetzsch, Ketsch; Werner Biffar, Frankenthal, all of Fed. Rep. of Germany

[73] Assignee: BASF Aktiengesellschaft, Ludwigshafen, Fed. Rep. of Germany

[21] Appl. No.: 875,571

[22] Filed: Jun. 18, 1986

[30] Foreign Application Priority Data

Jun. 19, 1985 [DE] Fed. Rep. of Germany ....... 3521767

[51] Int. Cl.$^4$ ............................................. B01J 35/04
[52] U.S. Cl. ........................................ 502/2; 502/527; 422/177; 422/180
[58] Field of Search ................... 502/527, 2; 422/177, 422/180

[56] References Cited

U.S. PATENT DOCUMENTS

| | | | |
|---|---|---|---|
| 3,489,208 | 1/1970 | Manteufel | 502/527 X |
| 3,785,781 | 1/1974 | Hervert et al. | 422/180 X |
| 3,887,741 | 6/1975 | Dwyer | 422/222 X |

FOREIGN PATENT DOCUMENTS

| | | |
|---|---|---|
| 0025308 | 3/1981 | European Pat. Off. . |
| 0073150 | 3/1983 | European Pat. Off. . |
| 1555188 | 12/1968 | France . |
| 2380072 | 2/1978 | France . |

*Primary Examiner*—Patrick P. Garvin
*Attorney, Agent, or Firm*—Keil & Weinkauf

[57] ABSTRACT

A novel fixed-bed catalyst structure obtained using honeycomb elements, for highly exothermic and endothermic chemical reactions, wherein the required heat exchange, both in the liquid phase and in the gas phase, is forcibly effected in the fixed catalyst bed by means of static mixing elements made of inert ceramic and/or metallic material or completely of catalyst material, between the individual honeycomb elements.

4 Claims, No Drawings

FIXED-BED CATALYST STRUCTURE OBTAINED USING HONEYCOMB ELEMENTS

The use of solid honeycomb elements has grown steadily in the past. They are used as filters, as packing material for wash towers and distillation columns, as heat shields, etc. Honeycombs have also been used successfully in heterogeneous catalysis, for example for the detoxification of combustion exhaust gases and for catalytic after-combustion.

In catalytic reactions, on the other hand, the use of solid honeycomb elements of this type is subject to greater restrictions. Because the inner channels run parallel to the longitudinal axis of the element, both mass transfer and heat exchange are substantially hindered. Thus, the use of honeycomb catalysts to date has been restricted to reactions which operate without the evolution of large amounts of heat or with very high dilution of the reaction components, and mixing of the reaction medium to give a homogeneous mixture before entry into the fixed honeycomb bed is a precondition.

It would also be advantageous from a kinetic, mechanical and design point of view to use honeycombs for many catalytic reactions which are very exothermic or endothermic. However, the skilled worker has to date been prevented from using solid honeycomb elements because of the problems in connection with mass transfer, and, in particular, heat exchange.

The present invention relates to a fixed-bed catalyst structure obtained using honeycomb elements, for highly exothermic and endothermic chemical reactions, wherein the required heat exchange, both in the liquid phase and in the gas phase, is forcibly effected in the fixed catalyst bed by means of static mixing elements between individual honeycomb elements.

Mixing elements of inert ceramic and/or metallic material can be used. It is possible to employ honeycombs consisting completely of catalytic material, or honeycomb carriers impregnated with the active component.

The novel alternative arrangement of the honeycombs and static mixers is particularly useful in the case of highly exothermic or endothermic organic reactions and is advantageously used in carrying out dehydrocyanizations, dehydrogenations, dehydrations, hydrogenations, elimination or alcohols and elimination of formamide.

Surprisingly, the problems of mass transfer and heat exchange mentioned above are solved if, for highly exothermic and endothermic reactions, the fixed catalyst bed is constructed by inserting static mixing elements consisting of inert ceramic and/or metallic material between the individual honeycomb elements, which are prepared completely from catalytic material or from inert material by extrusion or tableting, in a conventional manner. The structure according to the invention provides the necessary mass transfer and heat exchange at right angles to the product stream.

It is advantageous if, in the novel arrangement, the length of the honeycombs is optimized to take into account the reaction-specific heat transport required in each case, ie. shorter honeycombs and/or a larger number of static mixers are installed as the heat of reaction increases. The correct ratio can easily be determined empirically.

Honeycombs are produced, for example, starting from a mixture of the active catalytic components and, if necessary, further additives. This mixture can be molded, or first kneaded and then molded, for example with water, in the presence or absence of extrusion assistants, such as starch, methylcellulose, graphite, polyethylene glycols, polyvinyl alcohols, polyvinylpyrrolidones, polyacrylates, stearic acid and its metal salts, naphthalene, ammonia, formic acid, oxalic acid or nitric acid, which act as porosity-improving agents, as lubricants or as peptizing agents. Kneading followed by molding, in particular by extrusion, is preferred. The moldings obtained by extrusion can first be dried at from room temperature to 160° C. and then calcined at from 300° to 1000° C., and it may also be advantageous to carry out stepwise precalcination.

The honeycombs produced and installed can be of various shapes. The cross-section may be circular, oval or polygonal. The length can be several times the cross-section. A large number of parallel channels pass through the elements, the cross-section of the said channels likewise being circular, oval, curved or angular. The free cross-section of the flow area, which should be greater than 40%, plays a critical role with regard to achieving a low pressure loss. The strength of the honeycomb imposes restrictions on the size of the free cross-section.

The external dimensions of the honeycomb elements are such that the edge length of the base surface is up to 150 mm in the case of rectangular parallelepipeds, and the base surface has about the same diameter in the case of cylinders. The length of the honeycomb elements above the base surfaces can be greater than 1000 mm. The desired segment length is cut from this. The internal width of the inner channels is from 0.5 to 20 mm, and the thickness of the internal separating walls is usually from 0.1 to 5 mm.

Suitable static mixers are baffles, as generally employed for distillation columns. These mixing elements consist of ceramic and/or metallic materials.

In a particular embodiment, the mixing zone itself, ie. the length of the static mixer with its channels running obliquely with respect to the central axis, is chosen so that complete mass transfer, and hence heat exchange, takes place over the reactor cross-section. Consequently, the gases flowing along the reactor wall upstream of the mixing zone are directed exactly into the interior of the downstream honeycomb, and the gases flowing along the reactor axis are directed outward toward the reactor wall. Kerapak ® elements are an example of a suitable static mixer of this type.

The Examples which follow illustrate the novel process, which is used here for the preparation of vinylformamide by catalytic dehydrocyanization of formylalaninenitrile.

EXAMPLES

Preparation Of The Honeycomb 3000 g of —FeOOH (iron yellow), 27.6 g of $V_2O_5$, 78 g of $CrO_3$, 81 g of $WO_3$ and 34.5 g of $Li_2CO_3$ are mixed thoroughly with one another. This mixture is then converted to a slurry with 329 g of KOH, 168 g of potato starch and 28 g of methylcellulose, dissolved in 1 l of $H_2O$, and the slurry is thickened for 1 hour in a kneader. The plastic material is extruded to give honeycombs. The square base surface of the resulting rectangular parallelepiped has an edge length of 5 cm. The length of the rectangular parallelepiped itself is 12 cm. The 36 internal channels have a square end face possessing an internal edge length of 6 mm. The inner separating walls are 1.5 mm thick. These honeycombs are dried for 3 days at room temperature and then for 2 hours at increasing temperatures up to 150° C. Thereafter, the moldings are calcined for 1 hour at 500° C. and for 1 hour at increasing temperatures up to 805° C.

The catalyst is composed of 85.47% by weight of $Fe_2O_3$, 0.88% by weight of $V_2O_5$, 1.88% by weight of $Cr_2O_3$, 2.57% by weight of $WO_3$, 0.44% by weight of $Li_2O$ and 8.76% by weight of $K_2O$.

Dehydrocyanization

The dehydrocyanization is carried out in an electrically heated stainless steel tube reactor whose geometry is matched with that of the molding. The reactor is filled with 10×12 cm long honeycombs. Each honeycomb is separated from the next honeycomb by a 5 cm long static mixer (Kerapak ®). A thin film evaporator is located upstream of the pyrolysis tube. During the reaction, a reaction temperature of 460° C. and a pressure of 30 mbar are maintained. The space velocity is 0.8 kg of formylalaninenitrile per kg of catalyst per hour. 30 l/h of air are fed in simultaneously. A conversion of 97% and a selectivity of 93% are achieved.

For comparison, the pyrolysis is carried out over 10×12 cm long honeycombs, as described above, lying directly one on top of the other, in an electrically heated stainless steel tube reactor whose geometry is matched with that of the molding. In contrast to the previous case, no static mixers are installed between the solid honeycomb elements. A thin film evaporator is located upstream of the pyrolysis tube. During the reaction, a reaction temperature of 460° C. and a pressure of 30 mbar are maintained. The space velocity is 0.8 kg of formylalaninenitrile per kg of catalyst per hour. 30 l/hour of air are fed in simultaneously. A conversion of 90% and a selectivity of 87% are achieved.

We claim:

1. A fixed-bed catalyst reactor for use in highly endothermic and exothermic chemical reactions which comprises: a train of individual honeycomb catalyst elements and static mixing elements in contact with and between said honeycomb elements, said honeycomb elements containing multiple parallel channels through which liquid or gaseous reactants and reaction products flow; said mixing elements including channels which run obliquely with respect to the central axis of the mixing elements, whereby gases flowing along the wall of the honeycomb reactor element are directed into the interior of the downstream honeycomb element while gases flowing along the axis of the honeycomb reactor element are directed toward the reactor wall of the downstream honeycomb element, thus providing improved heat exchange between the gases flowing through the reactor and external heating or cooling means.

2. A fixed-bed catalyst reactor as defined in claim 1 wherein mixing elements of inert ceramic and/or metallic material are used.

3. A fixed-bed catalyst reactor as defined in claim 1 wherein honeycombs made completely of catalyst material or honeycombs which are impregnated with the active components are used.

4. The reactor of claim 1, wherein the honeycomb elements are formed entirely from catalytic materials and thus provide a solid catalyst.

* * * * *